United States Patent
Baldemair et al.

(10) Patent No.: US 9,936,523 B2
(45) Date of Patent: Apr. 3, 2018

(54) PRACH SIGNALS WITH DIFFERENT BANDWIDTHS

(71) Applicant: Telefonaktiebolaget L M Ericsson (publ), Stockholm (SE)

(72) Inventors: Robert Baldemair, Solna (SE); Kumar Balachandran, Pleasanton, CA (US); Johan Bergman, Stockholm (SE); Konstantinos Dimou, Stockholm (SE); Erik Eriksson, Linköping (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 505 days.

(21) Appl. No.: 14/115,716

(22) PCT Filed: Feb. 27, 2013

(86) PCT No.: PCT/SE2013/050177
§ 371 (c)(1),
(2) Date: Nov. 5, 2013

(87) PCT Pub. No.: WO2014/112912
PCT Pub. Date: Jul. 24, 2014

(65) Prior Publication Data
US 2014/0198742 A1    Jul. 17, 2014

Related U.S. Application Data

(60) Provisional application No. 61/753,257, filed on Jan. 16, 2013.

(51) Int. Cl.
*H04W 74/08* (2009.01)
(52) U.S. Cl.
CPC .............. *H04W 74/0833* (2013.01)

(58) Field of Classification Search
CPC ... H04L 5/0053; H04L 5/001; H04W 74/0833
(Continued)

(56) References Cited

U.S. PATENT DOCUMENTS

2008/0267126 A1* 10/2008 Vujcic ................. H04B 7/2637
370/330
2008/0316913 A1* 12/2008 Kim ...................... H04B 7/061
370/210

(Continued)

FOREIGN PATENT DOCUMENTS

WO    2012106798 A1    8/2012

OTHER PUBLICATIONS

Unknown, Author. "3rd Generation Partnership Project; Technical Specification Group Radio Access Network; Evolved Universal Terrestrial Radio Access (E-UTRA); Medium Access Control (MAC) protocol specification (Release 10)." 3GPP TS 36.321 V10.0.0. Dec. 2010.

(Continued)

*Primary Examiner* — Melvin Marcelo
(74) *Attorney, Agent, or Firm* — Murphy, Bilak & Homiller, PLLC

(57) ABSTRACT

The present disclosure concerns radio communication. More particularly, the present disclosure concerns random access procedures used in communication between user equipments (UEs) and radio network nodes, such as evolved NodeB's. According to one exemplary embodiment disclosed herein, a method in a UE 10 comprises transmitting 110, 130 two or more Physical Random Access Channel, PRACH, signals, where the two or more PRACH signals have different frequency bandwidths. Hereby it is made possible to improve the resource utilization during the random access procedure.

28 Claims, 8 Drawing Sheets

(58) Field of Classification Search
USPC .......................................................... 370/319
See application file for complete search history.

(56) References Cited

U.S. PATENT DOCUMENTS

| | | | |
|---|---|---|---|
| 2009/0203384 A1* | 8/2009 | Vujcic .................... | H04W 74/08 455/450 |
| 2011/0002321 A1* | 1/2011 | Iwai ..................... | H04J 13/0055 370/342 |
| 2011/0090863 A1 | 4/2011 | Hao et al. | |
| 2013/0083749 A1* | 4/2013 | Xu ..................... | H04W 74/0833 370/329 |
| 2013/0083753 A1* | 4/2013 | Lee .................... | H04W 72/0453 370/329 |

OTHER PUBLICATIONS

Unknown, Author. "3rd Generation Partnership Project; Technical Specification Group Radio Access Network; Evolved Universal Terrestrial Radio Access (E-UTRA); Radio Resource Control (RRC); Protocol specification (Release 10)." 3GPP TS 36.331 V10.3.0. Sep. 2011.

Dahlman, Erik et al. "4G LTE/LTE—Advanced for Mobile Broadband." Academic Press. 2011. Chapters 14.3 "Random Access" and 14.3.1.1 "PRACH Time-Frequency Resources".

Etsi, "LTE• Evolved Universal Terrestrial Radio Access (E-UTRA); Medium Access Control (MAC) protocol specification (3G PP TS 36.321 version 11.0.0 Release 11)", ETSI TS 136 321 V11.0.0, Oct. 2012, 1-57.

* cited by examiner

Abbreviations:
PRACH: Physical Random Access Channel
PDCCH: Physical Downlink Control Channel
RA-RNTI: Random Access – Radio Network Temporary Identifier
PDSCH: Physical Downlink Shared Channel
TC-RNTI: Temporary Cell RNTI
RRC: Radio Resource Control
PUSCH: Physical Uplink Shared Channel
C-RNTI: Cell RNTI

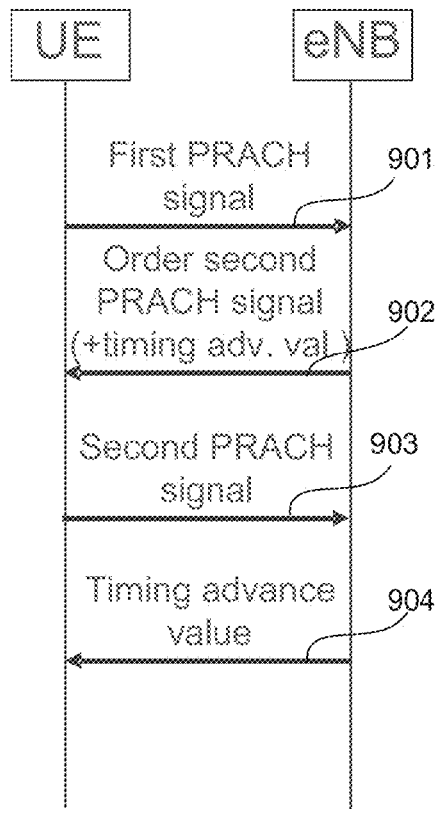
Fig. 9
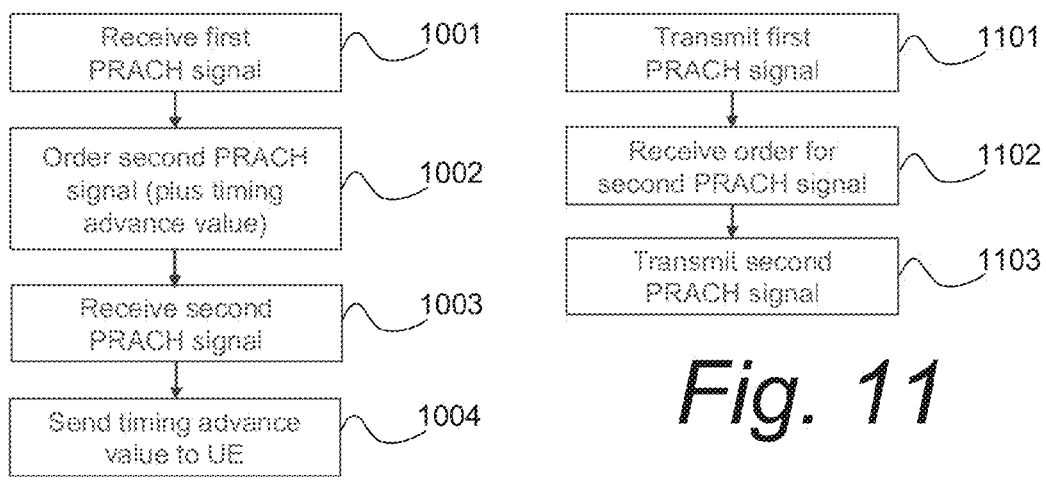
Fig. 10
Fig. 11

PRACH SIGNALS WITH DIFFERENT BANDWIDTHS

TECHNICAL FIELD

Embodiments presented herein generally relate to radio communication. More particularly, the embodiments presented herein relate to random access procedures in radio communication networks.

BACKGROUND

This section is intended to provide a background to the various embodiments of the technology that are described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by its inclusion in this section.

Detailed descriptions of radio communication networks and systems can be found in literature, such as in Technical Specifications published by, e.g., the $3^{rd}$ Generation Partnership Project (3GPP). 3GPP Long Term Evolution (LTE) is the fourth-generation radio communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

In 3GPP Release 10, the LTE random access procedure is a four-step procedure. The LTE random access procedure is used for initial access when establishing a radio link (e.g., moving the UE from RRC_IDLE to RRC_CONNECTED state), to re-establish a radio link after radio-link failure, to establish uplink (UL) synchronization, or as a scheduling request if no dedicated scheduling-request resources have been configured on the Physical Uplink Control Channel (PUCCH). The sequence of messages exchanged between the UE and the eNB during the random access procedure is schematically illustrated in FIG. 1, and further described below:

1. Generally speaking, the first step in the random-access procedure is the transmission of a random-access preamble on the Physical Random-Access Channel (PRACH). As part of the first step of the random-access procedure, the UE may randomly select one preamble to transmit, out of one of the two subsets defined for contention-based access. Subsets of preamble configurations within a cell can be seen in FIG. 2. Which subset to select the preamble from, can be given by the amount of data the UE would like to transmit on the Uplink Shared Channel (UL-SCH) in the third random access step. Which subset to select the preamble from, can e.g., also be given by the amount of data the UE is capable of transmitting on the UL-SCH in the third random access step (e.g., due to power limitations at the UE). Typically, subset 0 is selected by UEs with the aim of transmitting a limited amount of information, whilst preamble subset 1 is selected from UEs having assessed the potential to transmit higher payload within the third message of the random access procedure. The time/frequency resource to be used for this kind of transmissions (as illustrated in FIG. 3) can be given by the common PRACH configuration of the radio cell, which can be further limited by an optional, UE-specific mask, which may be limiting the available PRACH opportunities for the given UE (see e.g. 3GPP TS 36.321 v.10.0.0 and 3GPP TS 36.331 v.10.3.0 for further details).

2. The second step of the random-access procedure is the transmission of the Random Access Response. The eNB transmits a message on the Downlink Shared Channel (DL-SCH), the message comprising the index of the random-access preamble sequences the eNB detected and for which the response is valid, the timing correction (i.e. timing advance) calculated by the random-access preamble receiver, a scheduling grant, as well as a temporary identity (TC-RNTI, i.e. Temporary Cellular Radio Network Temporary Identifier) used for further communication between the UE and eNB. A UE which does not receive any Random Access Response in response to its initial random access preamble transmission of step 1 above within a pre-defined time window, i.e. time period, will generally consider the random access attempt as failed. If so, the UE will generally repeat its random access preamble transmission (possibly with higher transmit power) up to a number of maximum attempts (e.g. four times), before determining the entire random-access procedure as failed.

3. A purpose of the third step of the random access procedure is to assign a unique identity to the UE within the cell (C-RNTI, i.e. Cell Radio Network Temporary Identifier). In this step, the UE can transmit the necessary information to the eNB using the UL-SCH resources assigned to the UE in the Random Access Response. This message can thus allow the UE to adjust the grant size and modulation scheme as well as allowing for HARQ (i.e. Hybrid Automatic Repeat Request (ARQ)) with soft combining for the uplink message.

4. The fourth and final step of the random-access procedure is generally a downlink (DL) message for contention resolution. Based on the contention resolution message, each UE receiving the downlink message will compare the identity in the received message with identity transmitted in the third step. Only a UE that observes a match between the identity received in the fourth step and the identity transmitted as part of the third step will determine the random-access procedure to be successful. Otherwise, the UE will generally restart the random access procedure.

A more detailed description of the LTE random access procedure can be found in literature, such as in the reference book *4G LTE/LTE-Advanced for Mobile Broadband* by Erik Dahlman, Stefan Parkvall and Johan Sköld, Academic Press, 2011, ISBN:978-0-12-385489-6; see particularly chapter 14.3 "RANDOM ACCESS".

FIG. 4 illustrates the time-domain structure of PRACH preamble formats 0 to 3 as specified by 3GPP LTE. It should be appreciated that the PRACH preamble to be transmitted during the random access procedure can be one out of five different formats. In preamble format 0 and in preamble format 1, the preamble (excluding the cyclic prefix) is 800 μs long. Preamble format 0 and 1 prefix a cyclic prefix of 103 μs and 684 μs, respectively. The cyclic prefix should preferably cover the uncertainty in round trip time (plus maximum delay spread) in the radio cell. Preamble format 0 can thus be used in cells of up to approximately 15 km (100 μs roundtrip time) and preamble format 1 for radio cells of a radius of 100 km (667 μs roundtrip time). The main part of the cyclic prefix is in both cases 800 μs. That is, the path loss that both formats can sustain is generally the same. 3GPP LTE also specifies preamble formats 2 and 3, respectively, where the main part of the preamble is 1600 μs and comprises the twice repeated (excluding cyclic prefix) preamble formats 0 or 1. The cyclic prefix for preamble formats 2 and 3 is 203 μs and 684 μs, respectively. Due to the twice as long main part of the preamble (compared to preamble formats 0 and 1) preamble formats 2 and 3 can operate approximately at up to 3 dB higher path loss. Reference is made to FIG. 4 for a graphical illustration of the different preambles. Preamble formats 0 to 3 all span a bandwidth of approximately 1 MHz. In addition to the preamble formats 0 to 3 shown in FIG. 4, 3GPP LTE also defines a very short Format 4 which will not be further detailed herein. Typically, within one cell, one format is used. A more detailed description of the different preamble formats can be found in literature, such as in the reference book *4G LTE/LTE-Advanced for Mobile Broadband* by Erik Dahlman, Stefan Parkvall and Johan Sköld, Academic Press, 2011, ISBN: 978-0-12-385489-6, see particularly chapter 14.3.1.1 "PRACH Time-Frequency Resources".

After having successfully received the PRACH preamble, the eNB is generally aware that a PRACH preamble has been transmitted. Furthermore, the eNB is capable of deriving the time-of-arrival of the received PRACH signal and can thus calculate a timing-advance value that is needed for subsequent UL synchronization.

It should be appreciated that making the eNB aware that a PRACH preamble has been transmitted generally requires a certain quantity of energy contained in the PRACH signal. That is, the transmit power and time duration of the PRACH signal are important. Deriving the time-of-arrival of the received PRACH signal generally requires, in addition, a certain bandwidth to be able to estimate the time of arrival accurately. In 3GPP LTE this bandwidth has been determined to be around 1 MHz (Megahertz).

The inventors of the herein described technology have realized that in order to make the PRACH sustain higher path loss the simplest solution would be to just repeat the PRACH signal. As an example, if the PRACH should be able to operate at a 20 dB (decibel) higher path loss relative to the preamble format 0 a new PRACH preamble format has to be specified that repeats preamble format 0 (excluding the cyclic prefix) approximately 100 times. However, given that PRACH spans 1 MHz in frequency and approximately 1 millisecond (ms) in time, the reserved resources (i.e. 1 MHz×100 ms) would become unreasonable large. Furthermore, since the UEs that will need to use an extended PRACH signal duration are generally devices that are power-limited, the UEs do not gain much by using a wide-band PRACH signal. The available transmission power of the UE would be spread over a larger bandwidth since the power cannot generally be increased if it is already set to the maximum value the UE can support.

SUMMARY

It is in view of the above considerations and others that the various embodiments disclosed herein have been made.

In one of its aspects, the technology presented herein concerns a method performed by a user equipment (UE). The method comprises (1) transmitting a first Physical Random Access Channel, PRACH, signal to a radio network node, wherein the first PRACH signal has a first frequency bandwidth, and (2) transmitting a second PRACH signal to the radio network node, wherein the second PRACH signal has a second frequency bandwidth that is different from the first frequency bandwidth.

In an advantageous embodiment, the second frequency bandwidth of the second PRACH signal is wider than the first frequency bandwidth of the first PRACH signal. That is, the second frequency bandwidth of the second PRACH signal may be larger than the first frequency bandwidth of the first PRACH signal.

In some embodiments, the first frequency bandwidth of the first PRACH signal can be narrower than existing PRACH signals (i.e., narrower than the existing bandwidth of approximately 1 MHz) whereas the second frequency bandwidth is wider than the first frequency bandwidth. For example, the second frequency bandwidth may be around 1 MHz. Other values of the second frequency bandwidth are also conceivable.

In some embodiments, the first PRACH signal and the second PRACH signal may be centered around the same center frequency.

The method may further comprise transmitting the second PRACH signal immediately after transmission of the first PRACH signal. That is, the second PRACH signal may be transmitted in response to that the first PRACH signal has been transmitted. Or said differently, the second PRACH signal may be transmitted in response to that the first PRACH signal has been transmitted without receiving any signal (e.g., feedback signal) from the radio network node.

Alternatively, the method may comprise transmitting the second PRACH signal after a pre-defined period of time after transmission of the first PRACH signal. The pre-defined period of time may thus be fixed. For example, the pre-defined period of time can be specified in a 3GPP technical specification. Alternatively, the eNB could transmit (e.g., broadcast) information about the pre-defined period of time in a System Information (SI) message to UEs.

Yet further, the method may comprise transmitting the second PRACH signal after a period of time after transmission of the first PRACH signal, wherein said period of time is variable. The period of time may, e.g., be variable in dependence of signaling from the radio network node.

The method may additionally comprise: receiving a request signal from the radio network node, wherein said request signal comprises a request to transmit the second PRACH signal; and transmitting the second PRACH signal in response to receiving the request signal. The request signal may optionally comprise a timing advance value.

Also, the request signal may optionally comprise additional parameters that may be useful for the UE when the UE generates, or constructs, the second PRACH signal. As mere examples, the additional parameters may include: time-frequency resources for the second PRACH signal and/or parameters relating to the sequence that can be used for the second PRACH signal (in LTE, for example, Zadoff-Chu sequences). Also, any parameters needed to calculate a Zadoff-Chu sequence are possible parameters, such as root sequence index, cyclic shift, etcetera. Other additional parameters may include an index of the PRACH signal that should be transmitted provided that there is a fixed amount of second PRACH signals (which there typically is).

Furthermore, in some embodiments the second PRACH signal is transmitted utilizing frequency hopping.

In another of its example aspects, the technology disclosed herein relates to a method performed by a radio network node. The method comprises (1) receiving a first Physical Random Access Channel, PRACH, signal from a user equipment, UE, wherein the first PRACH signal has a first frequency bandwidth; and (2) receiving a second PRACH signal from the UE, wherein the second PRACH signal has a second frequency bandwidth that is different from the first frequency bandwidth.

Advantageously, the second frequency bandwidth of the second PRACH signal is wider than the first frequency bandwidth of the first PRACH signal. That is, the second frequency bandwidth of the second PRACH signal may be larger than the first frequency bandwidth of the first PRACH signal. In some embodiments, the first frequency bandwidth of the first PRACH signal can be narrower than existing PRACH signals whereas the second frequency bandwidth is wider than the first frequency bandwidth. For example, the second frequency bandwidth may be around 1 MHz. Other values of the second frequency bandwidth are of course also conceivable.

The first PRACH signal and the second PRACH signal may optionally be centered around the same center frequency.

The method may further comprise receiving the second PRACH signal immediately after reception of the first PRACH signal.

Alternatively, the method may comprise receiving the second PRACH signal after a pre-defined period of time after reception of the first PRACH signal. As described hereinabove, the pre-defined period of time may thus be fixed. Alternatively, the method may comprise receiving the second PRACH signal after a period of time after reception of the first PRACH signal, wherein the period of time is variable.

The method may also comprise, in response to receiving the first PRACH signal, transmitting a request signal to the UE, wherein said request signal comprises a request to transmit the second PRACH signal. The request signal may optionally comprise a timing advance value. Said timing advance value may, e.g., be derived by the radio network node from a timing of the first PRACH signal. Also, the request signal may optionally comprise additional parameters that may be useful for the UE when the UE generates, or constructs, the second PRACH signal. Moreover, the request signal may comprise additional parameters as described hereinabove.

In some embodiments, the method may furthermore comprise determining a traffic load parameter pertaining to a traffic load of a radio cell served by the radio network node; determining whether the traffic load parameter is below a pre-defined threshold; and transmitting the request signal only in response to that the traffic load parameter is determined to be below said pre-defined threshold. Thus, any transmission of the second PRACH signal can be made dependent on the traffic load in the radio cell served by the radio network node.

In some embodiments, the method can, additionally, or alternatively, be made dependent on the amount of data that is expected from the UE.

In yet another aspect, the technology presented herein concerns a user equipment UE. The UE may be configured to perform any of several of the methods summarized hereinabove. To this end, the UE may comprise a transmitter configured to transmit a first Physical Random Access Channel, PRACH, signal to a radio network node, wherein the first PRACH signal has a first frequency bandwidth; and furthermore configured to transmit a second PRACH signal to the radio network node, wherein the second PRACH signal has a second frequency bandwidth that is different from the first frequency bandwidth.

Again, the second frequency bandwidth of the second PRACH signal may be wider than the first frequency bandwidth of the first PRACH signal. Also, the first PRACH signal and the second PRACH signal may be centered around the same center frequency.

The transmitter may be configured to transmit the second PRACH signal immediately after the transmitter has transmitted the first PRACH signal. Alternatively, or additionally, the transmitter may be configured to transmit the second PRACH signal after a pre-defined period of time after the transmitter has transmitted the first PRACH signal. Alternatively, or additionally, the transmitter may be configured to transmit the second PRACH signal after period of time after the transmitter has transmitted the first PRACH signal, wherein said period of time is variable.

Also, the UE may additionally comprise a receiver configured to receive a request signal from the radio network node, wherein said request signal comprises a request to transmit the second PRACH signal; and wherein the transmitter is further configured to transmit the second PRACH signal in response to receiving the request signal. Said request signal may additionally comprise a timing advance value. Moreover, the request signal may comprise additional parameters that may be useful for the UE when the UE generates, or constructs, the second PRACH signal Furthermore, in some embodiments the transmitter is configured to transmit the second PRACH signal utilizing frequency hopping.

In still a further aspect, the technology presented herein concerns a radio network node, such as an evolved NodeB. The radio network node may be configured to perform any of several of the hereinabove summarized methods. To this end, the radio network node may comprise a receiver configured to receive a first Physical Random Access Channel, PRACH, signal from a user equipment, UE, wherein the first PRACH signal has a first frequency bandwidth; and furthermore to receive a second PRACH signal from the UE, wherein the second PRACH signal has a second frequency bandwidth which is different from the first frequency bandwidth.

The second frequency bandwidth of the second PRACH signal may be wider than the first frequency bandwidth of the first PRACH signal. Also, the first PRACH signal and the second PRACH signal may be centered around the same center frequency.

The receiver may be configured to receive the second PRACH signal immediately after the receiver has received the first PRACH signal. Alternatively, or additionally, the receiver may be configured to receive the second PRACH signal a pre-defined period of time after the receiver has received the first PRACH signal. Alternatively, or additionally, the receiver may be configured to receive the second PRACH signal a period of time after the receiver has received the first PRACH signal, wherein said period of time is variable.

Moreover, the transmitter may be configured to, in response to the receiver having received the first PRACH signal, transmit a request signal to the UE, wherein said request signal comprises a request to transmit the second PRACH signal. Said request signal may additionally comprise a timing advance value. Also, the radio network node may comprise a processor and a memory storing computer program code, which, when run in the processor, causes the radio network node to derive said timing advance value from a timing of the first PRACH signal. Also, the request signal may include additional parameters as described hereinabove.

According to some embodiments, the radio network node may comprise a processor; and a memory storing computer program code, which, when run in the processor causes the radio network node to determine a traffic load parameter pertaining to a traffic load of a radio cell served by the radio network node; determine whether the traffic load parameter is below a pre-defined threshold; and transmit, by means of the transmitter, the request signal only in response to that the traffic load parameter is determined to be below said pre-defined threshold.

As will be appreciated and according to some of the embodiments disclosed throughout this disclosure, it is proposed to transmit (from UE to eNB) at least two PRACH signals, where the at least two PRACH signals have different bandwidth. Advantageously, the first frequency bandwidth of the first PRACH signal is narrower than the second frequency bandwidth of the second PRACH signal. As will be further detailed herein below, using multiple PRACH signals with different frequency bandwidths can improve the resource utilization during a random access procedure.

BRIEF DESCRIPTION OF THE DRAWINGS

These and other aspects, features and advantages will be apparent and elucidated from the following description of various embodiments, reference being made to the accompanying drawings, in which:

FIG. 9 shows a signaling diagram, or flowchart, of an example method;

FIG. 10 shows a flowchart of an example method performed by a radio network node;

FIG. 11 shows a flowchart of an example method performed by a UE;

DETAILED DESCRIPTION

Figure 1:
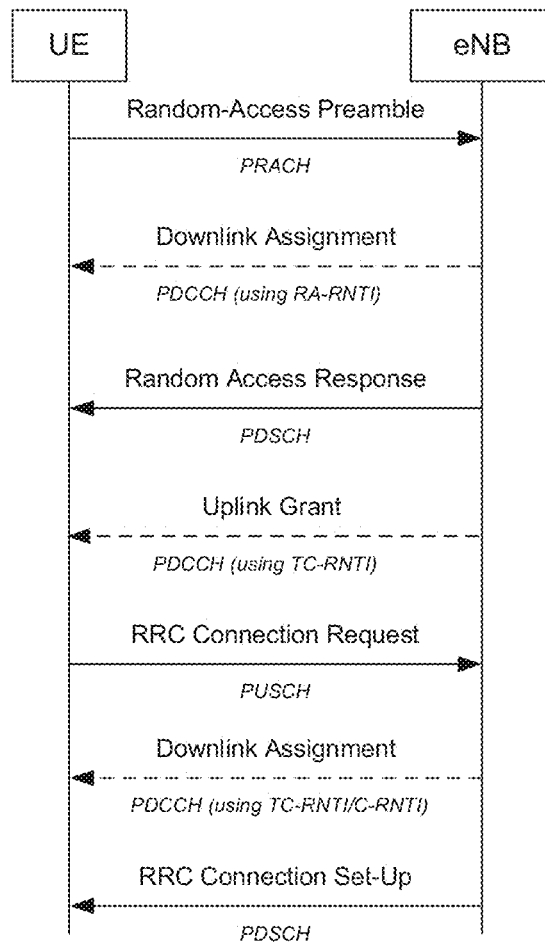
FIG. 1 shows a schematic illustration of an example random access procedure.

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a point (e.g. a fixed point) being capable of communicating with the UE. As such, it may be referred to as a base station, a radio base station, a NodeB or an evolved NodeB (eNB), access point, relay node, etcetera.

A method performed by a user equipment (UE) is proposed. The method comprises transmitting a first PRACH signal to a radio network node (e.g., a eNB), wherein the first PRACH signal has a first frequency bandwidth, and transmitting a second PRACH signal to the radio network node, wherein the second PRACH signal has a second frequency bandwidth that is different from the first frequency bandwidth. Also, a method performed by the radio network node is proposed. The method comprises receiving a first PRACH signal from the UE, wherein the first PRACH signal has a first frequency bandwidth; and receiving a second PRACH signal from the UE, wherein the second PRACH signal has a second frequency bandwidth that is different from the first frequency bandwidth. Advantageously, the second frequency bandwidth of the second PRACH signal is wider than the first frequency bandwidth of the first PRACH signal.

Consequently, the PRACH signal can be said to be divided into multiple (preferably, but not necessarily, two) PRACH signals. The first PRACH signal may be narrower than today's PRACH signal (i.e. narrower than approximately 1 MHz). Due to the lower bandwidth, this first PRACH signal may not be wide enough (in terms of frequency bandwidth) to enable time-of-arrival estimation with required accuracy. However, the second PRACH signal may be wider than the first PRACH signal, for example 1 MHz, and thereby providing sufficient accuracy for time-of-arrival measurements.

In this disclosure, it should be appreciated that the second PRACH signal is generally not transmitted in response to a failed transmission of the first PRACH signal. Rather, the first and second PRACH signals should be seen as two PRACH signals transmitted during the same random access (RA) procedure.

Figure 5A:
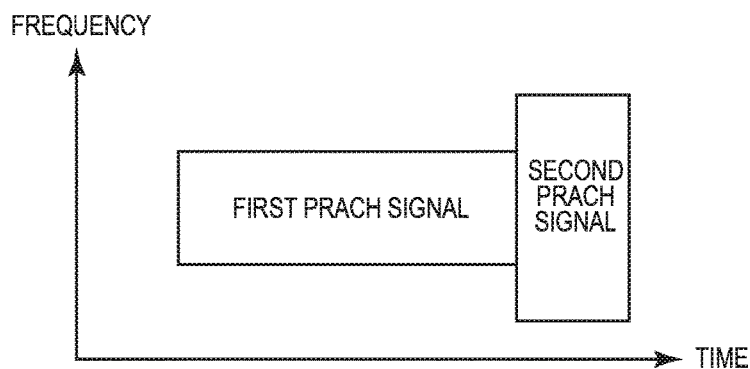
FIG. 5 illustrates a time-frequency illustration, or constitution, of two proposed PRACH signals.
Figure 5B:
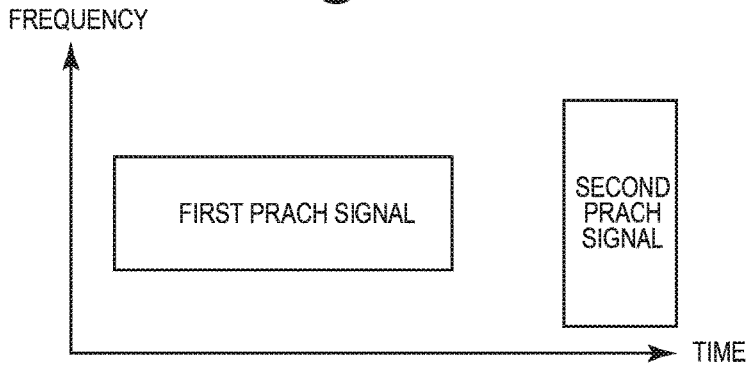

FIG. 5 shows a time-frequency illustration, or structure, of the proposed PRACH signals. In one embodiment illustrated in FIG. 5A, the second PRACH signal is transmitted from the UE to the radio network node immediately, or substantially immediately, after the transmission of the first PRACH signal. In other words, there is no waiting period, or delay, between the transmission of the first PRACH signal and the second PRACH signal. Instead, the second PRACH signal is transmitted immediately or shortly after the first PRACH signal, i.e. without receiving any feedback signal from the radio network node prior to transmitting the second PRACH signal. In an alternative embodiment illustrated in FIG. 5B, the second PRACH signal is not transmitted from the UE to the radio network node immediately, or substantially immediately, after the transmission of the first PRACH signal. Instead, the second PRACH signal is transmitted after a certain period of time after transmission of the first PRACH signal. In other words, there is a time gap between the transmission of the first PRACH signal and the transmission of the second PRACH signal. It should be appreciated that even though the first and second PRACH signals in FIG. 5 are illustrated to be centered on the same frequency, this is only an example. The first and second PRACH signals do not necessarily have to be aligned around the center frequency like this. Generally, a purpose of the wider second PRACH signal is to ensure that sufficient time alignment accuracy can be achieved. A general purpose of the narrower first PRACH signal is to enable concentration of the energy as much as possible in time and frequency in order to avoid wasting time-frequency resources.

The technology will now be described more fully hereinafter with reference to some exemplary embodiments:

1.1 No Time Gap Between First and Second PRACH Signals

The UE transmits the comparatively narrower first PRACH signal first. The first PRACH signal could, for example, be generated (or, constructed) by repeating a narrow-band signal with a signal design, or signal format, similar to that of LTE PRACH preamble format 0 (excluding the cyclic prefix), that is, mapping a sequence (with or without a precoder), e.g. CAZAC (Constant Amplitude Zero Autocorrelation), Zadoff-Chu, Frank, m-series, etc., to subcarriers multiple times. The overall signal could be prefixed by a cyclic prefix. Another possibility would be to use a completely new signal design, or signal format, e.g. a single-carrier waveform (with or without cyclic prefix) or a multi-carrier waveform (with or without cyclic prefix) spanning the desired region in the time-frequency plane. The time-duration in the LTE-like design or in a potential multi-carrier design could be controlled by a subcarrier spacing, e.g. a subcarrier spacing of 156.25 Hz would result in symbol duration (excluding potential repetitions and cyclic prefix) of 1/156.25=6.4 ms.

Immediately or shortly after (i.e., without receiving any feedback signal from the radio network node) transmission of this first PRACH signal, the UE transmits the second PRACH signal, which is wider in bandwidth compared with the first PRACH signal. The above mentioned signal design proposals would apply here as well. If the second PRACH signal comprises a cyclic prefix it can be smaller than the cyclic prefix added to the first PRACH signal since the receiver of the radio network node has (after its reception of the first PRACH signal) already some coarse timing information.

Figure 6:
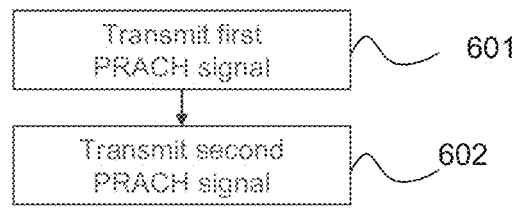
FIG. 6 shows a flowchart of an example method performed by a UE.

FIG. 6 schematically shows this method performed by the UE. The first PRACH signal is transmitted 601 to the radio network node. The first PRACH signal has a first frequency bandwidth. Also, the second PRACH signal is transmitted 602 to the radio network node. The second PRACH signal has a second frequency bandwidth that is different from the first frequency bandwidth. Advantageously, the second PRACH signal has a bandwidth that is wider than the bandwidth of the first PRACH signal.

Figure 7:
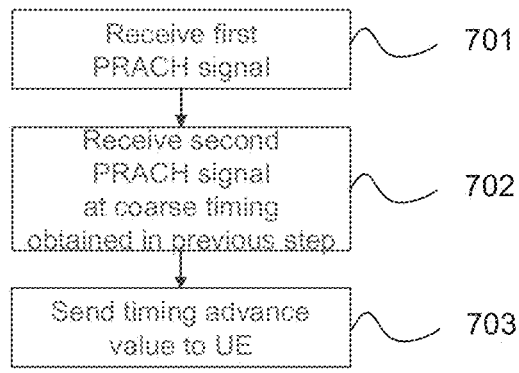
FIG. 7 shows a flowchart of an example method performed by a radio network node.
Figure 8:
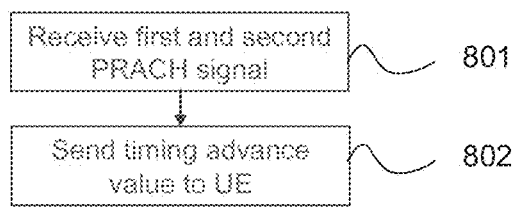
FIG. 8 shows a flowchart of an example method performed by a radio network node.

The processing in the eNB can, e.g., include trying to detect the first PRACH signal first (e.g. by means of a correlator matched to first PRACH signal) and once this has been detected to correlate the received signal after the part containing the first PRACH signal with a copy of the second PRACH signal. To this end, it should be appreciated that a receiver of the eNB can filter the received signal (i.e., the first PRACH signal) with a filter that is matched to the first PRACH signal. "Matched" means that this filter has an impulse response that is a time-reversal and complex-conjugate of the first PRACH signal. This is a matched filter, which is a proper receiver when in noise conditions. A matched filter is also a correlator. After the receiver of the eNB receives, and subsequently detects, the first PRACH signal, it may also know where the second PRACH signal will occur. The receiver therefore does not, generally, correlate the entire input signal with the second PRACH signal but only around the position where it knows the second PRACH signal will occur. Due to the wider bandwidth of the second PRACH signal the time resolution can be improved. The timing obtained after correlating with the second PRACH signal can, e.g., be used to determine the timing advance value that is sent to the UE, see FIG. 7. An alternative is that the eNB comprises a correlator that is matched to the combination of a first and second PRACH signal. In this case, this step already delivers an accurate timing estimate and thus timing advance value, see FIG. 8.

In a generalization of this idea, there may exist more than two PRACH signals. Thus, there may be multiple narrowband and wideband PRACH signals. Also, the comparatively wider PRACH signal could be transmitted prior to the comparatively narrower PRACH signal.

1.2 Time Gap Between First and Second PRACH Signals

As described earlier, the second PRACH signal can be transmitted after a pre-defined period of time after transmission of the first PRACH signal. In other words, there may exist a time gap between the transmission of the first PRACH signal and the second PRACH signal. If the time gap between first and second PRACH signals is pre-defined (either specified in the standard or the network (e.g., the eNB) broadcasts, or signals, the time gap duration in a system information (SI) message and the UE uses this information when transmitting PRACH signals) the eNB receiver can use any of two receiver alternatives outlined in Section 1.1, see FIGS. 6, 7 and 8.

In an alternative embodiment, the time gap is not pre-defined. In other words, the above-mentioned period of time is not pre-defined. Instead, the period of time (thus, the time gap) is variable. In this embodiment, the UE transmits the first PRACH signal. The radio network node tries to detect the first PRACH signal by correlating the first PRACH signal with a copy of the first PRACH signal and, furthermore, derives a coarse timing adjustment. The radio network node then transmits a request signal to the UE requesting, or ordering, the UE to transmit the second PRACH signal. This request signal may also comprise a timing advance value. The timing advance value can be based on the coarse timing derived from the first PRACH signal. After reception of this request signal the UE transmits the second PRACH signal. If the request signal comprised a timing advance value, the UE can apply the received timing advance value to the second PRACH signal. The radio network node then tries to detect the second PRACH signal by correlating the received signal with a copy of the second PRACH signal. The time instance at which the received signal is correlated with the second PRACH signal copy may depend on whether or not the radio network node previously transmitted a timing advance value. If the radio network node did so, the UE advances its transmission accordingly and sends, i.e. transmits, the second PRACH signal earlier (by the timing advance value), relative to the case where the UE sends the second PRACH signal without timing advance. The correlation of received signal and second PRACH signal may give a more accurate timing advance value, which is sent to the UE; see FIG. 9 for a schematic signaling diagram or flow chart between the UE and the radio network node. With reference to FIG. 9, the UE transmits 901 the first PRACH signal. After successful reception 901 of the first PRACH signal, the radio network node sends 902 a request signal to the UE for requesting the UE to transmit the second PRACH signal. Subsequently, the UE sends 903 the second PRACH signal. Upon successful reception 903 of the second PRACH signal, the radio network node may obtain accurate UL timing of the UE. The radio network node can thus send 904 the derived timing advance value to the UE. FIG. 10 and FIG. 11 show flowcharts of methods performed in the radio network node and the UE, respectively.

1.3 Alternative for Time Gap Between First and Second PRACH Signals

In one alternative version of the multiple PRACH signals, the signal transmitted by the UE may be limited to a fraction of a single resource block (RB) for the first PRACH signal, while multiple UEs are multiplexed within the PRACH region. The second PRACH signal may nominally span 6 RBs. Also, multiple UEs can be multiplexed in the time domain rather than in the frequency domain—this may achieve frequency orthogonality between first part preambles from different UEs and time orthogonality between second part preambles from different UEs. The time order in which the second part preambles are transmitted may be defined according to the frequency order of the first part preambles. As a mere example, the UE1, being aware that UE1 transmits at the first physical resource block (PRB) of the 6-RB bandwidth, transmits first. The UE2 transmits second, the UE 3 sends third, the UE4 sends fourth, etcetera.

The time staggering of second part preambles is optional, however, which means that there may be embodiments where the UEs are frequency-multiplexed in the first part preamble but not time-multiplexed in the second part preamble. This may, e.g., serve to minimize the access delay at the expense of a somewhat increased collision probability between second part preambles from different UEs.

Figure 12:
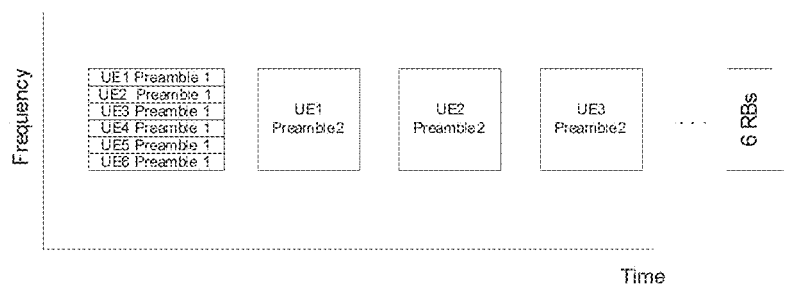
FIG. 12 illustrates an alternative time-frequency illustration, or constitution, of PRACH signals.

FIG. 12 illustrates a nominal PRACH region, where 6 RBs are allocated. Each UE transmits the first PRACH signal that is multiplexed in the frequency domain with multiple UEs (nominally 1 RB per UE). The second PRACH signal is either transmitted at a predetermined interval (6 RBs per UE) or is scheduled after successful reception of the first PRACH signal by the radio network node. The UE then sends the second PRACH signal. Upon successful reception of the second PRACH signal the radio network node can obtain accurate UL timing of the UE. The radio network node can thereafter send a signal comprising the derived timing advance value to the UE.

1.4 Alternatives Relating to the Transmission of the Second PRACH Signal

Figure 2:
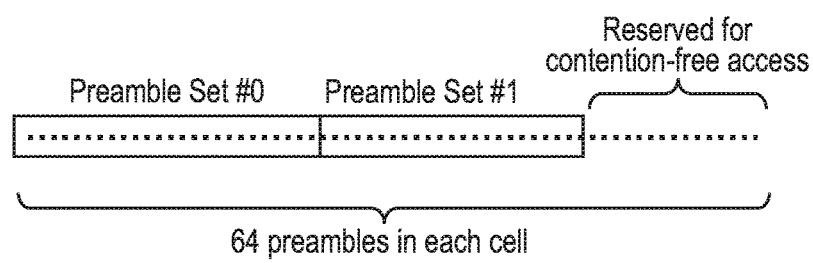
FIG. 2 shows example preamble subsets.

The message, i.e. a request signal, transmitted from the radio network node to the UE to request (i.e., order) the second PRACH signal can also comprise additional parameters for the UE to construct the second PRACH signal. For example, the request signal may additionally comprise information about which sequences to use for the second PRACH signal. There can also be a fixed (either specified in the standard or broadcasted, or signaled, in a system information message) relation between the signals used in the first and second PRACH signal. That is, if the UE used a certain first PRACH signal this can also determine (at least partly) the second PRACH signal. The request signal from the radio network node to the UE to transmit a second PRACH signal in order to acquire a more accurate timing can depend on the current uplink load in the serving cell. Potentially, it can also depend on the current uplink load in neighboring cells. Since an un-synchronized UE may create a lot of interference, it may be desired to avoid other simultaneous UL transmissions from other UEs in the cell (or in neighboring cells). However, a poor UL synchronization could be allowed in case of low UL traffic when a scheduler in the radio network node can afford to reserve an UL transmission time slot where no other UEs need to be scheduled. The advantage of allowing the UE to transmit without any fine synchronization is that it may reduce the delay as well as the control signaling overhead required to serve the UE. The decision not to send a request signal for requesting a second PRACH signal transmission from the UE may additionally, or alternatively, depend on the amount of data that the radio network node expects the UE to transmit. For example, if the UE is a utility meter (e.g., reporting electricity, gas, water consumption, etc.) or a sensor (e.g., reporting temperature or atmospheric pressure), the radio network node could know a-priori that the amount of data the UE will transmit will be relatively small and hence the gain associated with acquiring fine synchronization would not be worth the signaling cost. If this information is not known in the network, the UE can indicate the amount of data it wants to transmit (e.g., by indicating "large amount" or "small amount" in a message to the radio network node) by selecting PRACH pre-ambles from sub-set 0 or sub-set 1, see FIG. 2. As another possibility, the UE could indicate its required amount of data (i.e. large amount or small amount) through its selection of time-frequency resources when transmitting the first PRACH signal. For example, when selecting one out of the six frequency resources in the example in FIG. 12, the UE could select an odd-numbered frequency resource in case of large data and an even-numbered frequency resource in case of small data. This relation could be fixed in the standard or, alternatively, configurable by the network (e.g., by the eNB).

In case the UE is a power-limited UE (i.e. a UE with limited power), it might be difficult to generate, or construct, a wideband second PRACH signal that reaches the radio network node with sufficient power. One way to solve this is to design, or construct, the second PRACH signal as a narrow-band signal (e.g., 1 RB) with frequency hopping over a wide bandwidth (e.g., 6 RB). The coarse synchronization provided in the first step might then be sufficient to allow for many UEs to transmit orthogonal frequency hopping signals inside the same wide-band radio resource used for the second PRACH transmissions.

In alternative embodiments, the second PRACH signal may be an UL channel sounding reference signal (SRS). Since a SRS have a short duration in time compared to a normal UL transmission the interference from a SRS transmission with poor time synchronization might be acceptable while the interference from a normal UL data transmission is not. The technology disclosed herein therefore also covers the case where the UE is asked to perform a SRS transmission, on full or partial bandwidth, before any UL payload data is communicated.

1.5. Relation Between First and Second PRACH Signal

In some embodiments of the technology disclosed herein, the transmitted signal for the second PRACH signal may be determined fully by the selected first PRACH signal (potentially together with feedback received from signals from the radio network node prior to transmission of the second PRACH signal) or include an additional random draw from a set of possible PRACH signals. The set may be dependent on the first signal.

A potential benefit of having a deterministic relation, or connection, between the first and the second PRACH signals is reduced receiver complexity and improved performance for reception of the second PRACH signal, especially when the second PRACH signal has the comparatively wider bandwidth. The properties of the second PRACH signal (such as the preamble sequence and/or the position of the transmission in the time and frequency domains) may be given by the properties of the first PRACH signal. In case of frequency hopping in the second PRACH signal, the frequency hopping pattern may also be known once the first PRACH signal is known.

On the other hand, a potential benefit of having a randomization in the second PRACH signal may be improved contention resolution. This may enable a smaller preamble range for the first PRACH signal that may reduce the complexity and resource utilization of the first PRACH signal.

1.6. Further Example Embodiments Relating to the Relation Between the First and Second PRACH Signals and the Overall Random Access Procedure.

In an embodiment of the herein disclosed technology, the transmission of PRACH signals (or, preambles) of two different frequency bandwidths, with or without time gap between the PRACH signal transmissions, corresponds to the first step of the current random access (RA) procedure, see FIG. 1.

In a further embodiment of the technology, the transmission of the first narrow bandwidth RACH signal corresponds to step 1 of the current RA procedure as described with reference to FIG. 1 and the transmission of the wider bandwidth PRACH signal corresponds to step 3 of the RA procedure. This applies for both types of transmissions, i.e., with or without time gap between PRACH signals transmissions. In the case of PRACH signals transmissions with a gap in between transmissions, then, any necessary information at the UE for the third message of the current RA procedure, information such as (coarse) time advance, Temporary Cell Radio Network Temporary Identifier (TC-RNTI) are fed back from the radio network node to the UE, which information the UE makes use of for the RA signal transmission of the second PRACH signal with the larger bandwidth. In case the transmission of the second larger-bandwidth RA transmission takes place immediately or shortly after (i.e., without receiving any feedback from the base station) the initial narrower-bandwidth RA transmission, then the necessary information for the third message of the RA procedure is selected by the UE; namely, the UE performs some coarse time advance estimation without any feedback from the network (e.g., from the eNB). Such estimation can be done by considering the Received Signal Strength (RSS) level, i.e., roughly, the lower the RSS level, the larger the timing advance value, or by using other more advanced techniques such as the use of GPS (Global Positioning System) at the UE combined with knowledge of the position of the radio network node. The latter embodiment implies that the radio network node broadcasts its location (e.g., the x,y,z coordinates) in the radio cell. Another option would be that the radio network node transmits the exact time instant in absolute time values of each System Information Block transmission. The TC-RNTI can be selected by the UE among a given defined list of TC-RNTIs broadcasted in the cell.

Figure 3:
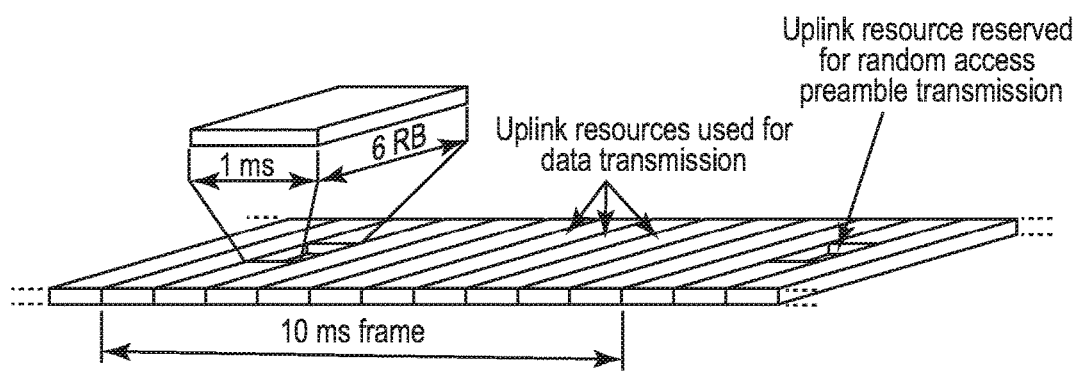
FIG. 3 shows an illustration of random-access preamble transmission.
Figure 4:
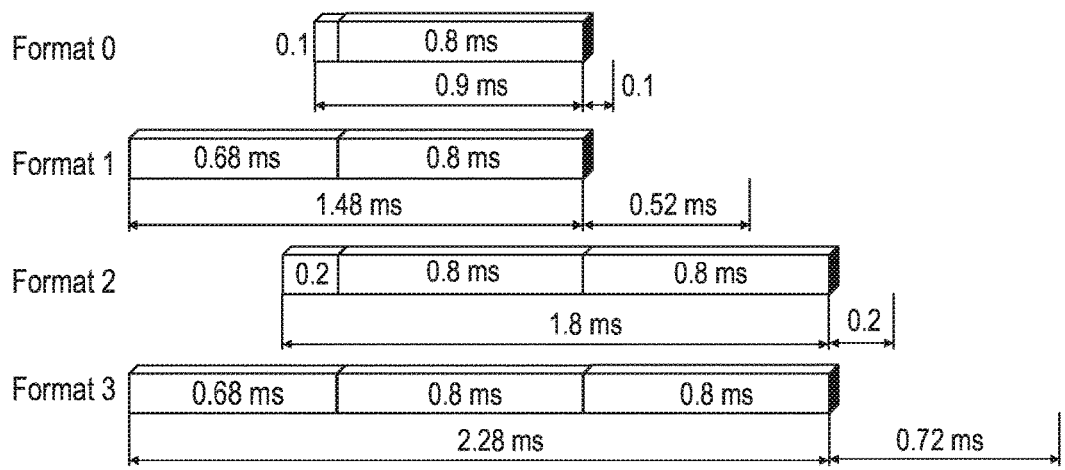
FIG. 4 illustrates different preamble formats.

In a further embodiment of the current technology, the first part of the narrower bandwidth RA signal (or preamble) transmission is taking place in specific (separate to the RA resources used for the normal RA procedure) oppositely allocated RA resources (similar to the ones described in FIG. 3).

In a further embodiment of the technology, the second RA signal (or, preamble) can be transmitted in a contention free manner, e.g., with the aid of specific for this purpose contention-free RA signals (or, preambles). This option is particularly feasible in case of the multi-bandwidth RA procedure with gaps between the transmissions of RA preambles of different bandwidths. The contention-free RA preamble (signal) can be fed by the radio network node to the UE in the duration of the gap. As can be understood, this could be a feasible option in case the first preamble is successfully received, since the proposed solution may imply feedback transmission from the radio network node. In such case, accurate time alignment can be obtained faster than in the case of contention based second preamble transmission. Alternatively, this option can be realized according to the procedure of FIG. 12. In yet a further embodiment of the technology the multi-bandwidth RA procedure performed here can be performed in a contention free mode. This applies for both RA signals. This option is feasible after the initial RA procedure following the UE activation within a given cell. Following this very first RA, a UE in need of coverage enhancement features can be granted by the network specific contention-free RA signals (preambles), which the UE in discussion here can use for future (subsequent) RA attempts. Such an option may become feasible in case the stationary nature of the UE and its traffic pattern are known at the network which may be the case e.g. for UEs connected to stationary utility meters. The stationary nature for such UEs could be indicated in the subscription information in the network or indicated in the SIM card information in the UE or estimated through long-term radio channel estimation (e.g. Doppler spread estimation) by the UE. In a further embodiment of the technology, the method of the previous embodiment involving contention-free RA attempt may be performed in predefined RA resources.

In a further embodiment of the current technology, the transmission of the second wider-bandwidth RA signal can be done in a contention-free manner for RA attempts following the very initial RA attempt (for both proposed methods, i.e., with and without gap between RA signals). This proposal hence is an extension of the proposal for contention-free second (larger bandwidth) preamble transmission in the case of gap (and feedback) from the network to both cases presented here: with and without gap between preambles. Hence, after the very initial (first) RA, the network may allocate dedicated preambles for the second preamble transmission to the UE, which are used by the UE in the future RA attempts, independently of the existence of gaps between preambles. In a further embodiment, the bandwidths of the first and second RA signal (preamble), as well as the gap size can be adjusted to optimal values. These values can be learned through a number of RA attempts or can be configured by the network (signaled via system information). Thus, this can be tested and evaluated in each specific case, e.g., in dependence of operator needs.

According to some embodiments described in this disclosure, the overall amount of resources used by the herein described multi-bandwidth random access procedure can be made smaller than the amount of resources used by a repetition of the LTE PRACH preamble.

1.7 User Equipment Examples

Figure 13:
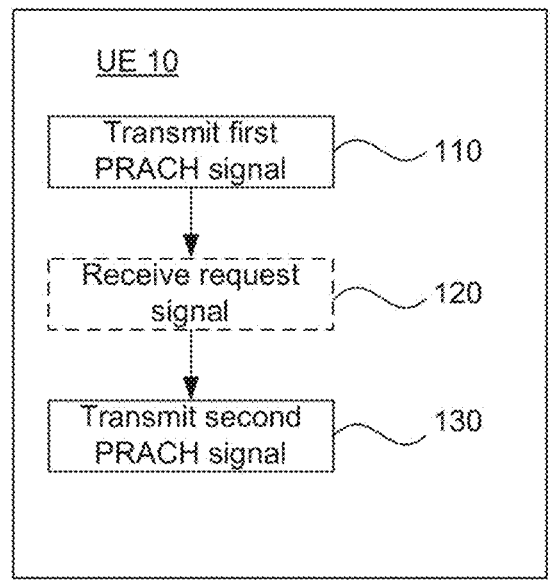
FIG. 13 shows an example embodiment of a UE.
Figure 14:
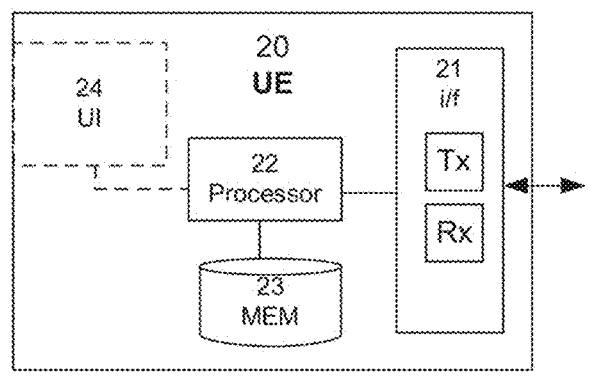
FIG. 14 shows another example embodiment of a UE.

FIG. 13 illustrates an exemplary user equipment 10 according to one aspect of the technology. The UE 10 is configured to transmit 110 a first PRACH signal to a radio network node. The first PRACH signal has a first frequency bandwidth. The UE 10 is also configured to transmit 130 a second PRACH signal to the radio network node. The second PRACH signal has a second frequency bandwidth which is different from the first frequency bandwidth. Advantageously, the second frequency bandwidth of the second PRACH signal is wider than the first frequency bandwidth of the first PRACH signal. For example, the first frequency bandwidth of the first PRACH signal may be narrower than 1 MHz and the second frequency bandwidth of the second PRACH signal may be approximately 1 MHz. Optionally, but not necessarily, the first PRACH signal and the second PRACH signal may be centered around the same center frequency. In one embodiment, the UE 10 is configured to transmit 130 the second PRACH signal immediately after transmission of the first PRACH signal (e.g. without receiving a request signal). Alternatively, the UE 10 may be configured to transmit 130 the second PRACH signal after a pre-defined period of time after transmission of the first PRACH signal. Alternatively, the UE 10 may be configured to transmit 130 the second PRACH signal after a variable period of time after transmission of the first PRACH signal. In another embodiment, the UE 10 may be configured to receive 120 a request signal from the radio network node, wherein said request signal comprises a request to transmit the second PRACH signal. The UE 10 may be further configured to transmit 130 the second PRACH signal in response to receiving 120 the request signal. In some embodiments, the request signal additionally comprises a timing advance value and possible also other parameters that can be used by the UE 10. Yet further, the UE 10 may be configured to transmit the second PRACH signal utilizing frequency hopping. FIG. 14 illustrates exemplary user equipment 20 according to another aspect of the technology. In this embodiment, the UE 20 comprises an interface module 21, a controlling module 22 (e.g. a processor), and a storage module 23 (e.g. a memory). Optionally, the UE 20 may also comprise a user interface 24 through which a user can operate and interact with the UE 20. The interface module 21 may comprise a transmitting module (Tx), or transmitter. The interface module may also comprise a receiving module (Rx), or receiver. Alternatively, the interface module 21 may comprise a transceiving module (Tx/Rx), or transceiver, with both transmission and reception capabilities.

In an example embodiment, a transmitter 21 is configured to transmit a first PRACH signal to a radio network node. The first PRACH signal has a first frequency bandwidth. Furthermore, the transmitter 21 is configured to transmit a second PRACH signal to the radio network node. The second PRACH signal has a second frequency bandwidth that is different from the first frequency bandwidth. In some embodiments, the storage module 23 stores computer program code which, when run in the controlling module 22, causes the UE 10 to transmit the first PRACH signal to a radio network node by means of the transmitter 21. The storage module 23 may also store computer program code that, when run in the controlling module 22, causes the UE 20 to transmit the second PRACH signal to the radio network node by means of the transmitter 21.

Again, the second frequency bandwidth of the second PRACH signal may advantageously be wider than the first frequency bandwidth of the first PRACH signal. For example, the first frequency bandwidth of the first PRACH signal may be narrower than 1 MHz and the second frequency bandwidth of the second PRACH signal may be approximately 1 MHz. Also, the first PRACH signal and the second PRACH signal may be centered around the same center frequency.

In one embodiment, the transmitter 21 is configured to transmit the second PRACH signal immediately after the transmitter has transmitted the first PRACH signal. In some embodiments, the storage module 23 may store computer program code that, when run in the controlling module 22, causes the UE 20 to transmit (by means of the transmitter 21) the second PRACH signal immediately after the transmitter 21 has transmitted the first PRACH signal.

Additionally, or alternatively, the transmitter 21 may be configured to transmit the second PRACH signal after a pre-defined period of time after the transmitter 21 has transmitted the first PRACH signal. For instance, the storage module 23 may store computer program code which, when run in the controlling module 22, causes the UE 10 to transmit (by means of the transmitter 21) the second PRACH signal after a pre-defined period of time after the transmitter 21 has transmitted the first PRACH signal.

Additionally, or alternatively, the transmitter 21 may be configured to transmit the second PRACH signal after a variable period of time after the transmitter 21 has transmitted the first PRACH signal. For instance, the storage module 23 may store computer program code which, when run in the controlling module 22, causes the UE 20 to transmit (by means of the transmitter 21) the second PRACH signal after a variable period of time after the transmitter 21 has transmitted the first PRACH signal.

Also, a receiver 21 may be configured to receive a request signal from the radio network node. The request signal may comprise a request to transmit the second PRACH signal. The transmitter 21 may hence also be configured to transmit the second PRACH signal in response to receiving the request signal. In one embodiment, the storage module 23 may store computer program code which, when run in the controlling module 22, causes the UE 20 to transmit (by means of the transmitter 21) the second PRACH signal in response to receiving the request signal. As described earlier, the request signal may optionally comprise a timing advance value and potentially also other parameters that can be used by the UE 20.

1.8 Radio Network Node Examples

Figure 15:
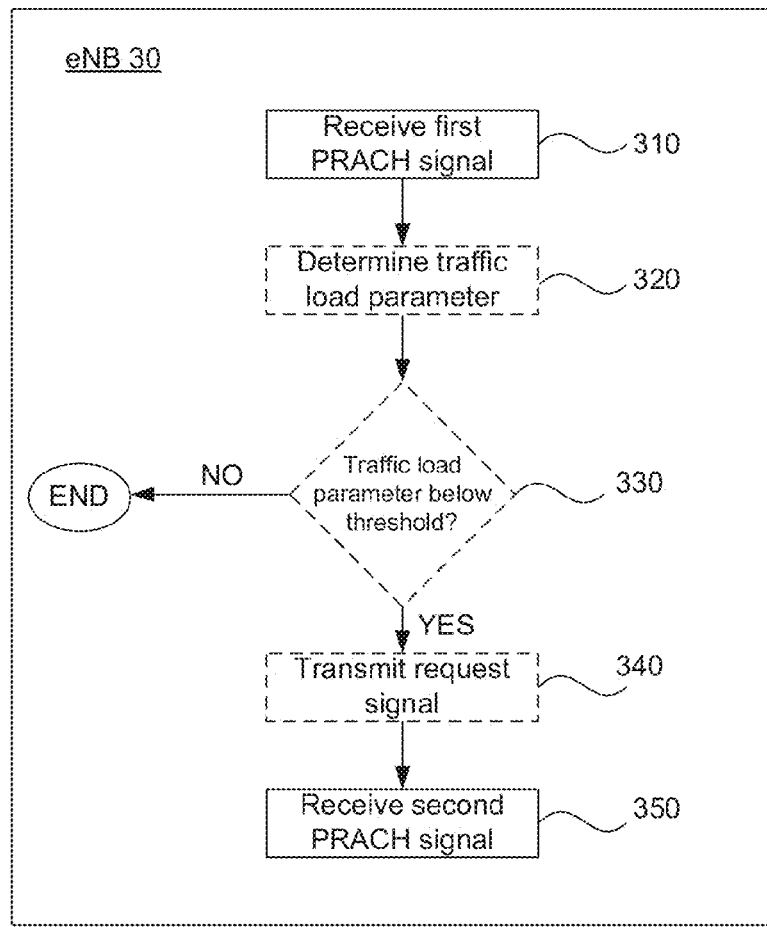
FIG. 15 shows an example embodiment of a radio network node.

FIG. 15 illustrates an exemplary radio network node 30 according to one aspect of the technology. The radio network node may be an evolved NodeB, eNB. Therefore, the radio network node will be exemplified as an eNB in the following description. The eNB 30 is configured to receive 310 a first PRACH signal from a user equipment (UE). The first PRACH signal has a first frequency bandwidth. The eNB 30 is also configured to receive 350 a second PRACH signal from the UE. The second PRACH signal has a second frequency bandwidth which is different from the first frequency bandwidth.

The second frequency bandwidth of the second PRACH signal may be wider than the first frequency bandwidth of the first PRACH signal. As a mere example, the first frequency bandwidth of the first PRACH signal may be narrower than 1 MHz and the second frequency bandwidth of the second PRACH signal may be approximately 1 MHz. Also, the first PRACH signal and the second PRACH signal may be centered around the same center frequency.

The eNB 30 may be configured to receive 350 the second PRACH signal immediately after reception 310 of the first PRACH signal. Additionally, or alternatively, the eNB 30 may be configured to receive 350 the second PRACH signal after a pre-defined period of time after reception 310 of the first PRACH signal. Additionally, or alternatively, the eNB 30 may be configured to receive 350 the second PRACH signal after a variable period of time after reception 310 of the first PRACH signal.

In some embodiments, the eNB 30 is optionally configured to transmit 340 a request signal to the UE. The eNB 30 may be configured to transmit 340 the request signal in response to receiving 310 the first PRACH signal. Said request signal comprises a request to transmit the second PRACH signal. The request signal may additionally comprise a timing advance value and potentially also other parameters that can be useful for the UE when generating or constructing a second PRACH signal.

In some embodiments, the eNB 30 is additionally configured to determine 320 a traffic load parameter pertaining to a traffic load of a radio cell served by the eNB 30 and furthermore to determine 330 whether the traffic load parameter is below a pre-defined threshold. If so, when the traffic load parameter is determined to be equal to or higher than the pre-defined threshold, the traffic load may be determined to be too high (see "NO" in FIG. 15). When the traffic load parameter is determined to be below the pre-defined threshold, the eNB 30 may be configured to transmit 340 the request signal. In other words, the transmission 340 of the request signal may be dependent on a preceding determination 320, 330 of the current load situation.

Figure 16:
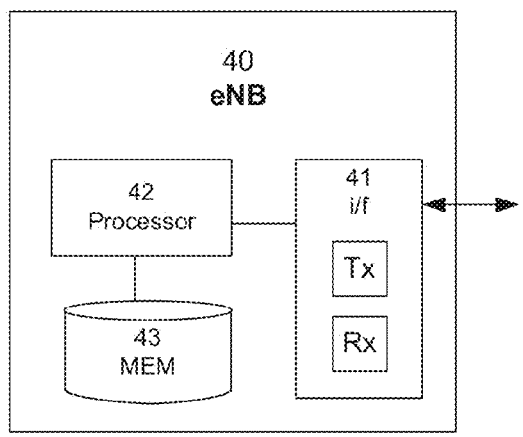
FIG. 16 shows another example embodiment of radio network node.

FIG. 16 illustrates exemplary radio network node 40 (e.g., an eNB) according to another aspect of the technology. In this embodiment, the eNB 40 comprises an interface module 41, a controlling module 42 (e.g. a processor), and a storage module 43 (e.g., a memory). The interface module 41 may comprise a transmitting module (Tx), or transmitter. The interface module 41 may also comprise a receiving module (Rx), or receiver. Alternatively, the interface module 41 may comprise a transceiving module (Tx/Rx), or transceiver, with both transmission and reception capabilities.

In an example embodiment, a receiver 41 is configured to receive a first PRACH signal from a user equipment (UE). The first PRACH signal has a first frequency bandwidth. The receiver 41 is furthermore configured to receive a second PRACH signal from the UE. The second PRACH signal has a second frequency bandwidth which is different from the first frequency bandwidth. The second frequency bandwidth of the second PRACH signal may e.g. be wider than the first frequency bandwidth of the first PRACH signal. As an example, the first frequency bandwidth of the first PRACH signal may be narrower than 1 MHz and the second frequency bandwidth of the second PRACH signal may be approximately 1 MHz. In some embodiments, the storage module 43 stores computer program code that, when run in the controlling module 42, causes the eNB 40 to receive (by means of the receiver 41) the first PRACH signal from the UE. The storage module 43 may also store computer program code that, when run in the controlling module 42, causes the eNB 40 to receive the second PRACH signal by means of the receiver 41.

The receiver 41 may be configured to receive the second PRACH signal immediately after the receiver 41 has received the first PRACH signal. In an example embodiment, the storage module 43 may store computer program code that, when run in the controlling module 42, causes the eNB 40 to enable reception of the second PRACH signal immediately after the receiver 41 has received the first PRACH signal.

Additionally, or alternatively, the receiver 41 may be configured to receive the second PRACH signal a pre-defined period of time after the receiver 41 has received the first PRACH signal. In an example embodiment, the storage module 43 may store computer program code that, when run in the controlling module 42, causes the eNB 40 to enable reception of the second PRACH signal a pre-defined period of time after the receiver 41 has received the first PRACH signal.

Additionally, or alternatively, the receiver 41 may be configured to receive the second PRACH signal a variable period of time after the receiver 41 has received the first PRACH signal. In an example embodiment, the storage module 43 may store computer program code that, when run in the controlling module 42, causes the eNB 40 to enable reception of the second PRACH signal a variable period of time after the receiver 41 has received the first PRACH signal.

Moreover, a transmitter 41 may be configured, in response to the receiver 41 having received the first PRACH signal, transmit a request signal to the UE, wherein said request signal comprises a request to transmit the second PRACH signal. In an example embodiment, the storage module 43 may store computer program code that, when run in the controlling module 42, causes the eNB 40 to transmit (by the transmitter 41) the request signal in response to that the receiver 41 has received the first PRACH signal. As mentioned earlier, the request signal may additionally comprise a timing advance value. For instance, the storage module 43 and the computer program code may be configured to, with the controlling module 42, cause the eNB 40 to derive said timing advance value from a timing of the first PRACH signal.

In some embodiments, the storage module 43 may store computer program code that, when run in the controlling module 42, causes the eNB 40 to determine a traffic load parameter pertaining to a traffic load of a radio cell served by the radio network node, determine whether the traffic load parameter is below a pre-defined threshold, and transmit, by means of the transmitter 41, the request signal only in response to that the traffic load parameter is determined to be below said pre-defined threshold.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the various embodiments of this disclosure have been described above with reference to specific embodiments, it is not intended to be limited to the specific form set forth herein. For example, while the various embodiments have been described with respect to the transmission and/or reception of two PRACH signals with different bandwidths, it will come to mind to one skilled in the art having benefit of the teachings presented in the foregoing description and associated drawings that the embodiments presented herein can equally possible be extended such that more than two PRACH signals with different bandwidths are utilized. It should thus be appreciated that there could be a plurality n number of PRACH signals with different frequency bandwidths (BW). For example, a first frequency bandwidth of a first PRACH signal may be narrower than a second frequency bandwidth of a second PRACH signal, and the second frequency bandwidth may be narrower than a third frequency bandwidth of a third PRACH signal, and the third frequency bandwidth may be narrower than that of a n:th PRACH signal, i.e. $BW_1 < BW_2 < \ldots < BW_n$.

Selected Example Embodiments

The technology disclosed herein thus encompasses without limitation the following non-limiting example embodiments:

Example embodiment M1: A method performed by a user equipment, UE, the method comprising:
  transmitting a first Physical Random Access Channel, PRACH, signal to a radio network node, wherein the first PRACH signal has a first frequency bandwidth; and
  transmitting a second PRACH signal to the radio network node, wherein the second PRACH signal has a second frequency bandwidth that is different from the first frequency bandwidth.

Example embodiment M2: The method according to example M1, wherein the second frequency bandwidth of the second PRACH signal is wider than the first frequency bandwidth of the first PRACH signal.

Example embodiment M3: The method according to example M1 or M2, wherein the first PRACH signal and the second PRACH signal are centered around the same center frequency.

Example embodiment M4: The method according to example M1, M2 or M3, comprising:
  transmitting the second PRACH signal immediately after, i.e., immediately following, transmission of the first PRACH signal.

Example embodiment M5: The method according to example M1, M2 or M3, comprising:
  transmitting the second PRACH signal after a pre-defined period of time after transmission of the first PRACH signal.

Example embodiment M6: The method according to example M1, M2 or M3, comprising:
  transmitting the second PRACH signal after a period of time after transmission of the first PRACH signal, wherein said period of time is variable.

Example embodiment M7: The method according to example M5 or M6, comprising:
  receiving a request signal from the radio network node, wherein said request signal comprises a request to transmit the second PRACH signal; and
  transmitting the second PRACH signal in response to receiving the request signal.

Example embodiment M8: The method according to example M7, wherein said request signal additionally comprises a timing advance value.

Example embodiment M9: A method performed by a radio network node, the method comprising:
  receiving a first Physical Random Access Channel, PRACH, signal from a user equipment, UE, wherein the first PRACH signal has a first frequency bandwidth; and
  receiving a second PRACH signal from the UE, wherein the second PRACH signal has a second frequency bandwidth that is different from the first frequency bandwidth.

Example embodiment M10: The method according to example M9, wherein the second frequency bandwidth of the second PRACH signal is wider than the first frequency bandwidth of the first PRACH signal.

Example embodiment M11: The method according to example M9 or M10, wherein the first PRACH signal and the second PRACH signal are centered around the same center frequency.

Example embodiment M12: The method according to example M9, M10 or M11, comprising:
  receiving the second PRACH signal immediately after, i.e., immediately following, reception of the first PRACH signal.

Example embodiment M13: The method according to example M9, M10 or M11, comprising:
  receiving the second PRACH signal after a pre-defined period of time after reception of the first PRACH signal.

Example embodiment M14: The method according to example M9, M10 or M11, comprising:
  receiving the second PRACH signal after a period of time after reception of the first PRACH signal, wherein said period of time is variable.

Example embodiment M15: The method according to example M13 or M14, comprising:
  in response to receiving the first PRACH signal, transmitting a request signal to the UE, wherein said request signal comprises a request to transmit the second PRACH signal.

Example embodiment M16: The method according to example M15, wherein said request signal additionally comprises a timing advance value.

Example embodiment M17: The method according to example M16, wherein said timing advance value is derived from a timing of the first PRACH signal.

Example embodiment M18: The method according to example M15, M16 or M17, comprising:
- determining a traffic load parameter pertaining to a traffic load of a radio cell served by the radio network node;
- determining whether the traffic load parameter is below a pre-defined threshold; and
- transmitting the request signal only in response to that the traffic load parameter is determined to be below said pre-defined threshold.

Example embodiment U1: A user equipment, UE, comprising:
- a transmitter configured to transmit a first Physical Random Access Channel, PRACH, signal to a radio network node, wherein the first PRACH signal has a first frequency bandwidth; and furthermore configured to transmit a second PRACH signal to the radio network node, wherein the second PRACH signal has a second frequency bandwidth that is different from the first frequency bandwidth.

Example embodiment U2: The UE according to example U1, wherein the second frequency bandwidth of the second PRACH signal is wider than the first frequency bandwidth of the first PRACH signal.

Example embodiment U3: The UE according to example U1 or U2, wherein the first PRACH signal and the second PRACH signal are centered around the same center frequency.

Example embodiment U4: The UE according to example U1, U2 or U3, wherein the transmitter is configured to transmit the second PRACH signal immediately after the transmitter has transmitted the first PRACH signal.

Example embodiment U5: The UE according to example U1, U2 or U3, wherein the transmitter is configured to transmit the second PRACH signal after a pre-defined period of time after the transmitter has transmitted the first PRACH signal.

Example embodiment U6: The UE according to example U1, U2 or U3, wherein the transmitter is configured to transmit the second PRACH signal after a period of time after the transmitter has transmitted the first PRACH signal, wherein said period of time is variable.

Example embodiment U7: The UE according to example U5 or U6, further comprising a receiver configured to receive a request signal from the radio network node, wherein said request signal comprises a request to transmit the second PRACH signal; and wherein the transmitter is further configured to transmit the second PRACH signal in response to receiving the request signal.

Example embodiment U8: The UE according to example U7, wherein said request signal additionally comprises a timing advance value.

Example embodiment N1: A radio network node, comprising:
- a receiver configured to receive a first Physical Random Access Channel, PRACH, signal from a user equipment, UE, wherein the first PRACH signal has a first frequency bandwidth; and furthermore to receive a second PRACH signal from the UE, wherein the second PRACH signal has a second frequency bandwidth that is different from the first frequency bandwidth.

Example embodiment N2: The radio network node according to example N1, wherein the second frequency bandwidth of the second PRACH signal is wider than the first frequency bandwidth of the first PRACH signal.

Example embodiment N3: The radio network node according to example N1 or N2, wherein the first PRACH signal and the second PRACH signal are centered around the same center frequency.

Example embodiment N4: The radio network node according to example N1, N2 or N3, wherein the receiver is configured to receive the second PRACH signal immediately after the receiver has received the first PRACH signal.

Example embodiment N5: The radio network node according to example N1, N2 or N3, wherein the receiver is configured to receive the second PRACH signal a pre-defined period of time after the receiver has received the first PRACH signal.

Example embodiment N6: The radio network node according to example N1, N2 or N3, wherein the receiver is configured to receive the second PRACH signal a period of time after the receiver has received the first PRACH signal, wherein said period of time is variable.

Example embodiment N7: The radio network node according to example N5 or N6, wherein the transmitter is configured to, in response to the receiver having received the first PRACH signal, transmit a request signal to the UE, wherein said request signal comprises a request to transmit the second PRACH signal.

Example embodiment N8: The radio network node according to example N7, wherein said request signal additionally comprises a timing advance value.

Example embodiment N9: The radio network node according to example N8, wherein the memory and the computer program code are configured to, with the processor, cause the radio network node to derive said timing advance value from a timing of the first PRACH signal.

Example embodiment N10: The radio network node according to example N7, N8 or N9, comprising a processor; and a memory storing computer program code, which, when run in the processor causes the radio network node to determine a traffic load parameter pertaining to a traffic load of a radio cell served by the radio network node; determine whether the traffic load parameter is below a pre-defined threshold; and transmit, by means of the transmitter, the request signal only in response to that the traffic load parameter is determined to be below said pre-defined threshold.

Example embodiment N11: The radio network node according to any of the examples N1-N10, wherein the radio network node is an evolved NodeB, eNB.

Example embodiment N12: The radio network node according to any of the examples N1-N10, wherein the radio network node is a relay node.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, the technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not

The invention claimed is:

1. A method performed by a user equipment (UE), the method comprising:
   transmitting a first Physical Random Access Channel (PRACH) signal to a radio network node, wherein the first PRACH signal has a first frequency bandwidth; and
   transmitting, subsequent to the transmission of the first PRACH signal, a second PRACH signal to the radio network node, wherein the second PRACH signal has a second frequency bandwidth that is different from the first frequency bandwidth,
   wherein the first PRACH signal and second PRACH signal are transmitted as parts of a same random access procedure.

2. The method of claim 1, wherein the second frequency bandwidth of the second PRACH signal is wider than the first frequency bandwidth of the first PRACH signal.

3. The method of claim 2, wherein the first frequency bandwidth of the first PRACH signal is narrower than one megahertz.

4. The method of claim 3, wherein the second frequency bandwidth of the second PRACH signal is approximately one megahertz.

5. The method of claim 1, comprising transmitting the second PRACH signal immediately after transmission of the first PRACH signal, wherein the second PRACH signal is transmitted without receiving, from the radio network node, any feedback signal corresponding to the first PRACH signal.

6. The method of claim 1, comprising transmitting the second PRACH signal a pre-defined period of time after transmission of the first PRACH signal.

7. The method of claim 1, comprising:
   receiving a request signal from the radio network node, wherein said request signal comprises a request to transmit the second PRACH signal; and
   transmitting the second PRACH signal in response to receiving the request signal.

8. The method of claim 1, comprising transmitting the second PRACH signal a period of time after transmission of the first PRACH signal, wherein said period of time is variable.

9. The method of claim 1, wherein the second PRACH signal is transmitted utilizing frequency hopping.

10. The method of claim 1, wherein the first PRACH signal and the second PRACH signal are centered around the same center frequency.

11. A method performed by a radio network node, the method comprising:
    receiving a first Physical Random Access Channel (PRACH) signal from a user equipment (UE), wherein the first PRACH signal has a first frequency bandwidth; and
    receiving, subsequent to the reception of the first PRACH signal, a second PRACH signal from the UE, wherein the second PRACH signal has a second frequency bandwidth that is different from the first frequency bandwidth,
    wherein the first PRACH signal and the second PRACH signal are received as parts of a same random access procedure.

12. The method of claim 11, wherein the second frequency bandwidth of the second PRACH signal is wider than the first frequency bandwidth of the first PRACH signal.

13. The method of claim 12, wherein the first frequency bandwidth of the first PRACH signal is narrower than one megahertz.

14. The method of claim 13, wherein the second frequency bandwidth of the second PRACH signal is approximately one megahertz.

15. The method of claim 11, comprising receiving the second PRACH signal immediately after reception of the first PRACH signal, wherein the second PRACH signal is received before transmitting any feedback signal to the UE corresponding to reception of the first PRACH signal.

16. The method of claim 11, comprising receiving the second PRACH signal a pre-defined period of time after reception of the first PRACH signal.

17. The method of claim 11, comprising transmitting a request signal to the UE, in response to receiving the first PRACH signal, wherein said request signal comprises a request to transmit the second PRACH signal.

18. The method of claim 11, comprising receiving the second PRACH signal a period of time after reception of the first PRACH signal, wherein said period of time is variable.

19. The method of claim 11, wherein the first PRACH signal and the second PRACH signal are centered around the same center frequency.

20. A user equipment (UE), comprising:
    a transmitter configured to transmit a first Physical Random Access Channel (PRACH) signal to a radio network node, wherein the first PRACH signal has a first frequency bandwidth; and further configured to subsequently transmit a second PRACH signal to the radio network node, wherein the second PRACH signal has a second frequency bandwidth that is different from the first frequency bandwidth,
    wherein the transmitter is configured to transmit the first PRACH signal and the second PRACH signal as parts of a same random access procedure.

21. The UE of claim 20, wherein the transmitter is configured to transmit the second PRACH signal a pre-defined period of time after the transmitter has transmitted the first PRACH signal.

22. The UE of claim 20, further comprising a receiver configured to receive a request signal from the radio network node, wherein said request signal comprises a request to transmit the second PRACH signal; and wherein the transmitter is further configured to transmit the second PRACH signal in response to receiving the request signal.

23. The UE of claim 20, wherein the transmitter is configured to transmit the second PRACH signal a period of time after the transmitter has transmitted the first PRACH signal, wherein said period of time is variable.

24. The UE of claim 20, wherein the transmitter is configured to transmit the second PRACH signal utilizing frequency hopping.

25. A radio network node comprising:
    a receiver configured to receive a first Physical Random Access Channel (PRACH) signal from a user equipment (UE) wherein the first PRACH signal has a first frequency bandwidth; and configured further to subsequently receive a second PRACH signal from the UE, wherein the second PRACH signal has a second frequency bandwidth that is different from the first frequency bandwidth, wherein the receiver is configured to receive the first PRACH signal and the second PRACH signal as parts of a same random access procedure.

26. The radio network node of claim 25, wherein the receiver is configured to receive the second PRACH signal a pre-defined period of time after the receiver has received the first PRACH signal.

27. The radio network node of claim 25, further comprising a transmitter configured to transmit a request signal to the UE in response to the receiver having received the first PRACH signal, wherein said request signal comprises a request to transmit the second PRACH signal.

28. The radio network node of claim 25, wherein the receiver is configured to receive the second PRACH signal a period of time after the receiver has received the first PRACH signal, wherein said period of time is variable.

* * * * *